United States Patent [19]

Parker

[11] Patent Number: 4,851,075

[45] Date of Patent: Jul. 25, 1989

[54] MACHINES FOR COLLATING FORMS

[75] Inventor: Colin R. Parker, Sheldon, England

[73] Assignees: Kalamazoo PLC; Bowe Systems and Machinery (UK) Limited, both of England

[21] Appl. No.: 145,113

[22] Filed: Jan. 19, 1988

[30] Foreign Application Priority Data

Jan. 24, 1987 [GB] United Kingdom ................. 8701577

[51] Int. Cl.[4] ............................................. B32B 31/04

[52] U.S. Cl. ................................... 156/556; 156/558; 156/559; 156/566; 225/93; 225/100; 270/52; 270/58; 271/10; 271/113; 271/121; 271/237; 271/245; 271/151

[58] Field of Search ............... 156/264, 266, 252, 253, 156/512, 516, 517, 558, 559, 556, 566; 83/920; 270/58, 52, 59, 52.5; 271/113, 121, 123, 10, 109, 244, 245, 151, 237; 225/93, 98, 100, 101, 105, 106

[56] References Cited

U.S. PATENT DOCUMENTS

| | | | |
|---|---|---|---|
| 2,816,755 | 12/1957 | Dusenbury et al. | 270/58 |
| 2,816,756 | 12/1957 | Dusenbury et al. | 270/58 |
| 2,819,067 | 1/1958 | Dusenbury | 270/58 |
| 3,336,024 | 8/1967 | Brechner | 270/58 |
| 3,565,728 | 2/1971 | Alton | 156/566 |
| 3,863,821 | 2/1975 | Bennekom | 225/93 |
| 4,019,733 | 4/1977 | Mantalto | 271/245 |
| 4,328,064 | 5/1982 | Miller et al. | 156/566 |
| 4,529,114 | 7/1985 | Casper et al. | 225/100 |

FOREIGN PATENT DOCUMENTS

| | | |
|---|---|---|
| 2089329A | 6/1982 | United Kingdom . |
| 2152482A | 8/1985 | United Kingdom . |
| 2179922 | 3/1987 | United Kingdom . |

*Primary Examiner*—Caleb Weston

*Attorney, Agent, or Firm*—Davis, Bujold & Streck

[57] ABSTRACT

A machine for providing a collation of a series of forms with partial overlap defined by a predetermined stagger from a continuous web of such forms has; a tractor feed for feeding the web into a separating station; bursting rollers for separating the web along transverse lines; a conveyor for feeding individual forms consecutively to a collation station; a rotatable stop and indexing conveyor for advancing a form at the registration station through a distance of the stagger with respect to the next form to be received at the registration station, whereby each form as it arrives at the registration station is offset from the preceding form by the predetermined stagger; adhesive being applied to the forms to hold them together with said predetermined stagger.

8 Claims, 5 Drawing Sheets

MACHINES FOR COLLATING FORMS

BACKGROUND OF THE INVENTION

The invention relates to a machine for providing a collation of a series of forms with partial overlap defined by a predetermined stagger from a continuous web of such forms.

It is often a requirement to assemble forms such as cheques in an arrangement known as shingling in which the cheques or other forms are laid one on top of another with a partial overlap defined by a predetermined stagger. This allows cheques or other forms to be assembled in such a way that as they are filled in individually before removal from the assembly, a record of an inscription on the form can be left on a single record sheet behind the shingled forms by pressure-sensitive copying such as by use of a carbon film or carbonless copying papers.

The conventional way of shingling cheques or other forms takes as a starting point a stack of such forms which are to be shingled. The forms are picked one at a time from the stack and supplied consecutively to a collation registration station. Means are provided for indexing a form at the registration station through the distance of the stagger required to define the shingling prior to receipt of the next form at the registration station whereby each form as it arrives at the registration station is offset from the preceding form by the predetermined stagger. Means are also provided for holding the forms together with this predetermined stagger.

The stack of individual forms which constitutes the input to the conventional shingling equipment can be produced from a continuous web of such forms which is separated into individual forms to produce the required stack of forms.

The speed of operation of the conventional shingling equipment is normally limited by the rate at which the individual forms can be picked from a stack to feed them to the registration station. Any attempt to increase the speed of the equipment generally involves increasing the speed of a reciprocating mechanism which in turn leads to misfeeds.

An object of the present invention is to provide a machine for collating a series of forms with partial overlap defined by a predetermined stagger, which machine can operate more quickly than conventional machines.

SUMMARY OF THE INVENTION

In accordance with the present invention there is provided a machine for providing a collation of a series of forms with partial overlap defined by a predetermined stagger from a continuous web of such forms, the machine comprising means for feeding with web continuously into a separating station, means at the separating station for separating the web along transverse lines, means for feeding the individual forms consecutively to a collation registration station, means for advancing a form at the registration station through the distance of the stagger with respect to the next form to be received at the registration station whereby each form at it arrives at the registration station is offset from the preceding form by the predetermined stagger and means for holding forms together with said predetermined stagger.

BRIEF DESCRIPTION OF THE DRAWINGS

Embodiments of the invention will now be described by way of example only with reference to the accompanying drawings in which.

DESCRIPTION OF A PREFERRED EMBODIMENT

Figure 1:
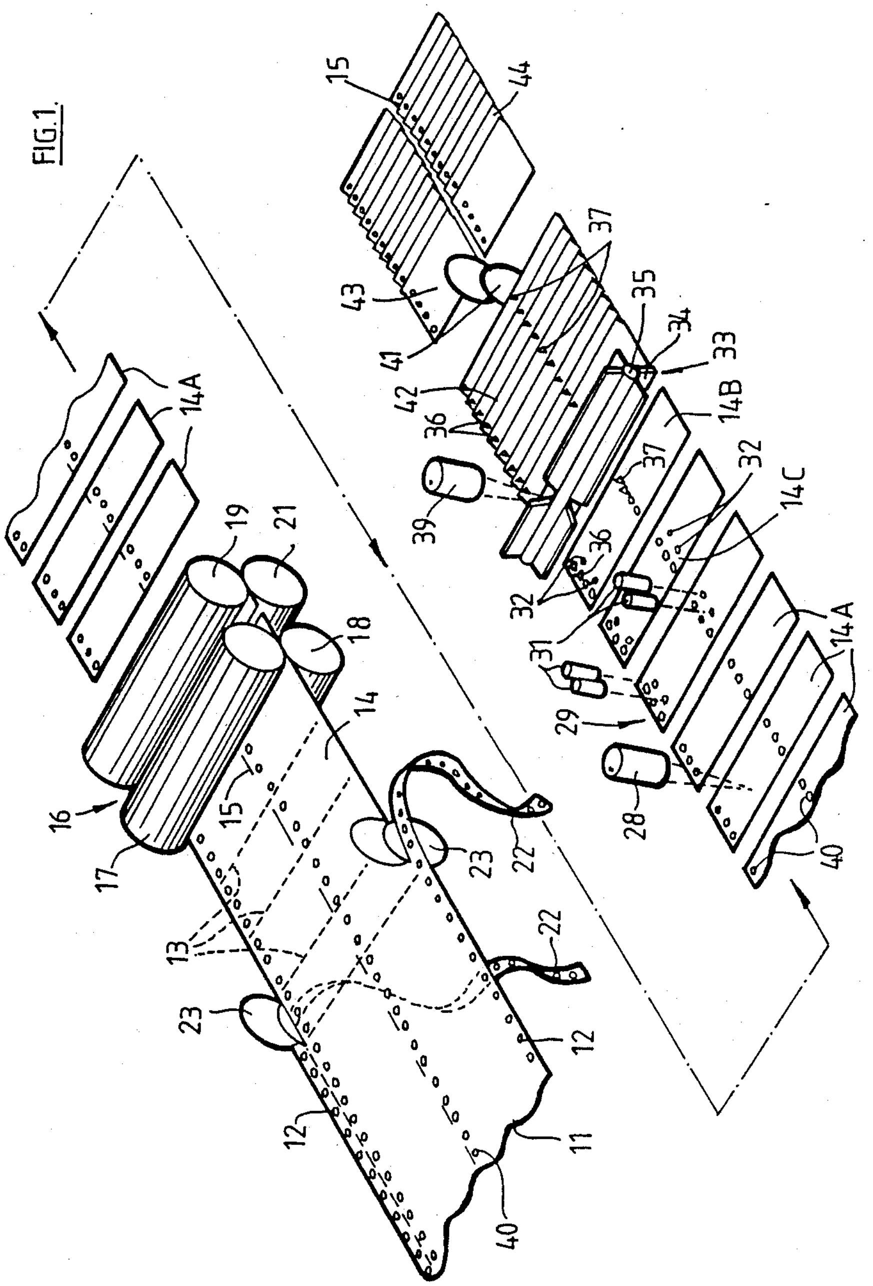
FIG. 1 is a diagrammatic representation of a web and the forms passing through a machine in accordance with the invention showing the operations carried out on the web and forms.
Figure 2:
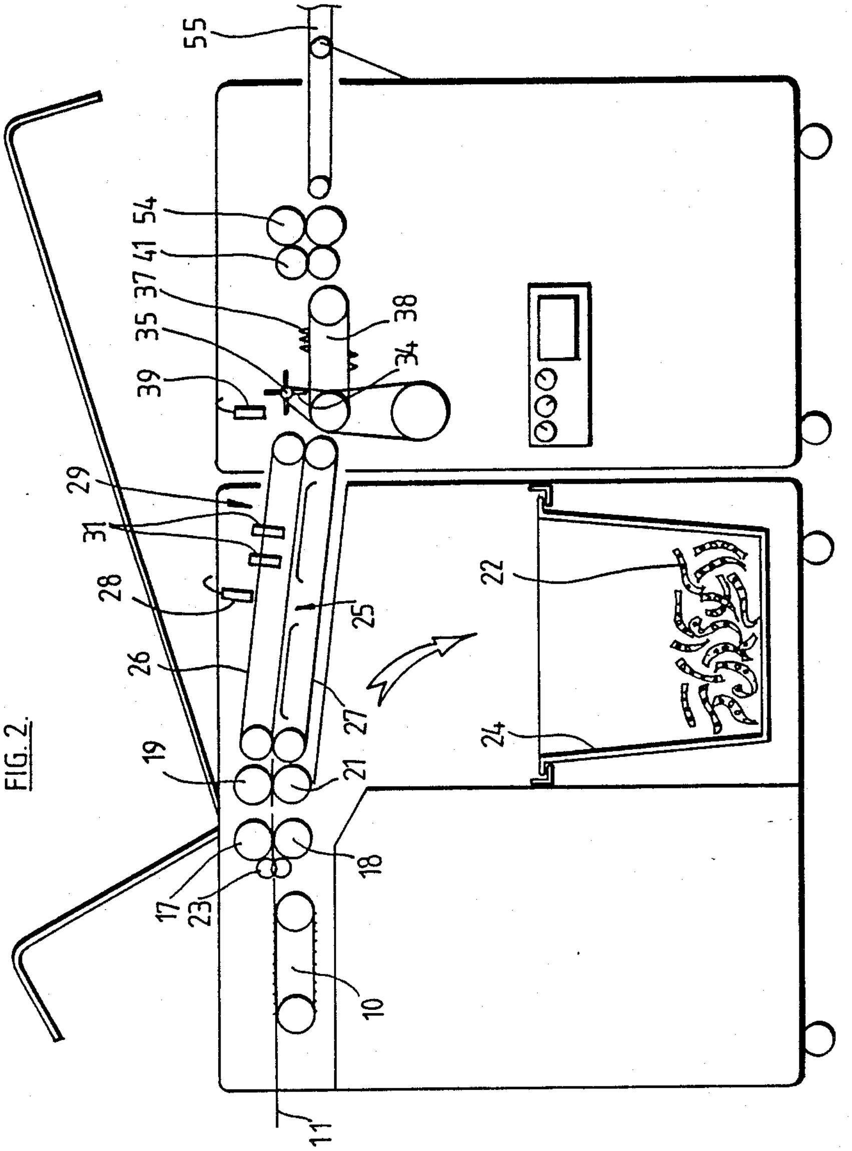
FIG. 2 is a diagrammatic cross-section through a complete machine.

The basic layout of the machine and its principles of operation can best be explained with reference to FIGS. 1 and 2 by describing the progress of material through the machine from the input of the a continuous web to the output of shingled forms. The forms may be cheques which can be shingled into batches of ten or any other required number. In this example the web is pre-perforated along transverse lines of the intended boundaries between forms and the separating station is a bursting station at which the web is burst into individual forms along these lines.

A continuous web 11 is fed into the machine at a controlled rate determined by a tractor feed 10 (FIG. 2) which engages with drive holes 12 along both margins of the web. The web is pre-perforated along transverse lines such as 13 to define individual forms 14 between each individual pair of perforation lines. As will be explained subsequently, each form 14 is in effect two cheques placed side by side which will be divided into individual cheques by slitting along a centre line 15.

The web is fed to a bursting station 16 defined between a pair of input bursting rollers 17 and 18 and a pair of output bursting rollers 19 and 21. The bursting rollers 17 and 18 cooperate with each other to grip the web and draw it off from the tractor feed. Immediately prior to feeding the web to the bursting station 16, the margins 22 of the web carrying the tractor feed holes 12 are slit from the edges of the web by slitters 23. The margins 22 are discarded into a bin 24.

At the bursting station 16, the bursting rollers 17 and 18 are arranged to rotate in synchronism with the tractor feed. In contrast, the output rollers 19 and 21 are arranged to rotate at a speed very slightly higher than that of the input rollers. The rollers can be moved apart through a small distance so that the web can run freely between them without being gripped thereby. When a bursting operation is required, that is when a line of perforations 13 is in position between the sets of input and output rollers, the rollers 17, 18 and 19, 21 are brought together to grip the web at both the input and the output of the bursting station. The output rollers 19 and 21 tend to pull the web at a higher speed than is permitted by the input rollers 17 and 18 with the result that the web is burst along the line of perforations to separate it into individual forms. In this way, cheques 14 are supplied at regular intervals at the output from the rollers 19 and 20. Proprietory bursting machines are available to perform the bursting operation described above.

In preparation for holding the forms together with a predetermined stagger, spots of an adhesive medium are applied to the individual forms 14 after they have left the bursting station 16. To this end, the forms are conveyed on a conveyor 25 which travels faster than the web itself so that the forms are spaced apart as shown at 14A. The conveyor has upper and lower belts 26 and 27 so that it holds the individual forms accurately. A photo cell 28 detects the forms and causes them to be counted as they pass on the conveyor through an adhesive station 29. At the adhesive station adhesive heads 31 apply adhesive represented by blobs 32 to two longitudinal lines of the forms which will eventually represent left hand margins of cheques. The adhesive heads 31 are arranged to release individual blobs at precisely timed intervals under the control of detection of a form by the photo cell 28 so that adhesive is applied to the forms but not to spaces in the conveyor. When forms are to be shingled in batches ten, nine consecutive forms are supplied with adhesive but every tenth form is left without any adhesive.

The individual forms with adhesive applied are fed to a registration station 33 at which the form 14B is shown in position. The registration station is defined primarily by a stop 34 against which the form comes to rest, this stop being one of four such stops on a rotary member referred to as a paddle wheel 35. At the registration station, the form is engaged by drive pegs arranged in two rows 36 and 37 which enter guide holes 40 in the forms. In this example the pegs are arranged on an indexing conveyor 38 (FIG. 2). The arrival of a form such as 14B at the registration station 33 is detected by a photo cell 39. Once the form has arrived and engaged on pegs 36 and 37, the stop 34 is removed by partial rotation of the paddle wheel so that the stop 34 moves away from the form and the subsequent stop or paddle on its descent into the position shown for paddle 34 ensures that the form is engaged positively on pegs 36 and 37. On removal of stop 34, the indexing conveyor 38 is indexed through a distance equal to the pitch between pegs which is the same as the pitch between guide holes 40 in the individual forms. This pitch also corresponds to the predetermined stagger with which the forms are to be shingled. Once the form 14B has been indexed through the stagger distance, the subsequent form 14C arrives at the registration station and it is automatically in a position offset by the required stagger from the form 14B. This process continues and a batch of shingled forms is built up. The forms are held together by the adhesive and to assist this, pressure may be applied along the adhesive lines to spread the adhesive and more firmly engage the forms with each other.

When every tenth form is left without adhesive the forms are collated together in batches of ten. The shingled forms are also fed past a central slitter 41 which slits the forms down the centre line 15 to slit each batch of shingled forms such as 42 into two batches of shingled cheques 43 and 44. The batches of shingled cheques are then stacked together at the output from the machine from where they are available for subsequent processes.

Clearly the invention could be applied to other kinds of forms beside cheques and clearly the slitting of the forms along a a longitudinal centre line is optional from the point of view of other kinds of forms. However, it is advantageous to deal with cheques in wide webs with two cheques across the web because the substantial width assists in accurate location of each form at the registration station and also accurate detection of a position of a form for application of adhesive.

Figure 3:
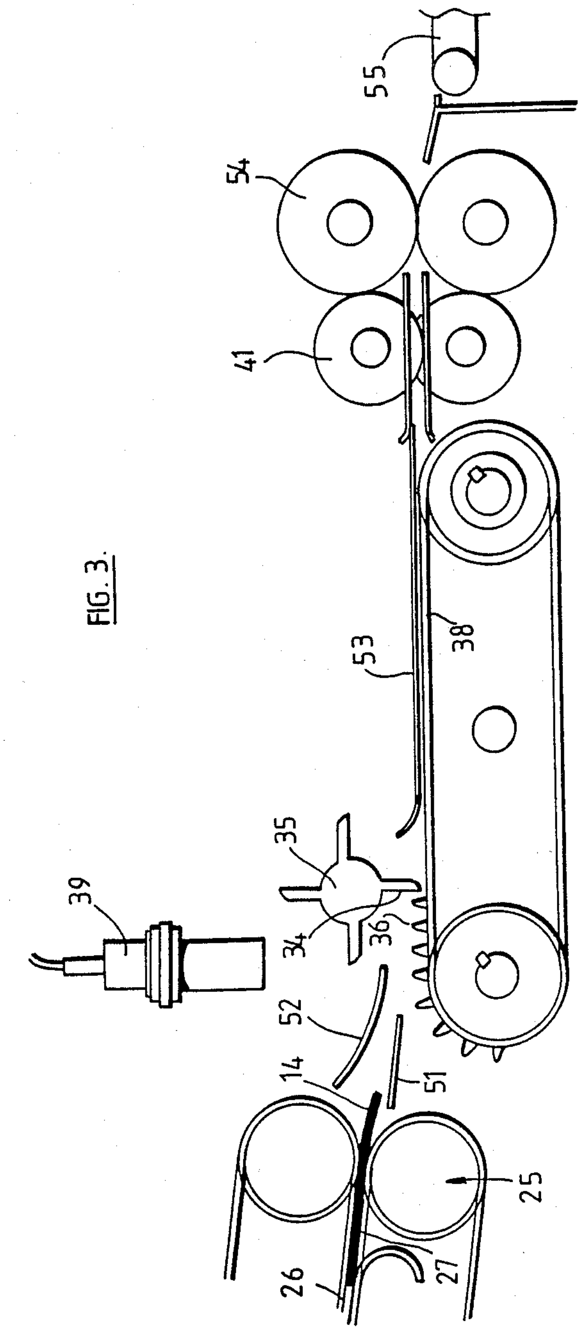
FIG. 3 shows the registration station and shingling part of the machine in greater detail.

FIG. 3 shows the registration station 33 and other parts in greater detail. A form 14 constituted by two cheques side by side is shown in a position where it is about to be discharged from conveyor 25 where it is gripped between the two belts 26 and 27. The form is arranged to slide over a guide plate 51 and under a deflector plate 52 until it comes up against stop 34 of paddle wheel 35. Its forward end at least then drops down so that its guide holes 40 (see FIG. 1) engage on the tapered pegs 36. The taper on the pegs ensures that slight misalignment can be tolerated without preventing the forms from engaging the pegs. The paddle wheel 35 and indexing conveyor 38 carrying pegs 36 are driven in synchronism such that the paddle wheel rotates through 90° on each movement and correspondingly the indexing conveyor indexes through a distance equal to the pitch between adjacent pegs 36. The pegs 36 act as a means for engagement with the guide holes in a form for alignment of forms in a transverse direction, registration of one form with the preceding form and transportation of the forms. This indexing operation is initiated by a photo cell 39 which is arranged to detect the arrival of a form at the registration station. There is sufficient delay between detecting the leading edge of a form and the form arriving at stop 34 and dropping to pegs 36 to ensure that a form is stopped and in position before the paddle wheel and indexing conveyor are moved on.

Two pressure guides 53 are arranged at transverse positions where they coincide with the blobs 32 of adhesive so that as forms are passed under guide 53 on conveyor 38 they are firmly pressed together and the adhesive is spread out.

Beyond the conveyor 38 the collated batches of shingled forms may be slit centrally by the central slitter 41 before passing through exit rollers 54 and being discharged onto a delivery conveyor 55 or the platen of an end stacker.

As an alternative to the slitter 41, the forms may be slit at an earlier stage in the process. Also, the process may be carried out on forms in a single stream which do not require any centre slitting.

The combined burster and shingler described above is able to shingle forms at a rate of at least 40,000 forms per hour per stream and possibly as high as 100,000 forms per hour per stream, giving twice these rates for cheques when each web incorporates two streams as described above. This compares very favourably with a maximum rate of up to 18,000 forms per hour for a conventional shingling machine. One factor assisting these high rates to be achieved is the fact that the forms do not have to be picked off a stack at the beginning of the shingling operation. Also, the parts of the machine which stop and start during the shingling operation, namely paddle wheel 35 and conveyor 38, are relatively small and light and move through a relatively short distance, allowing a short cycle time for the movements.

Figure 4:
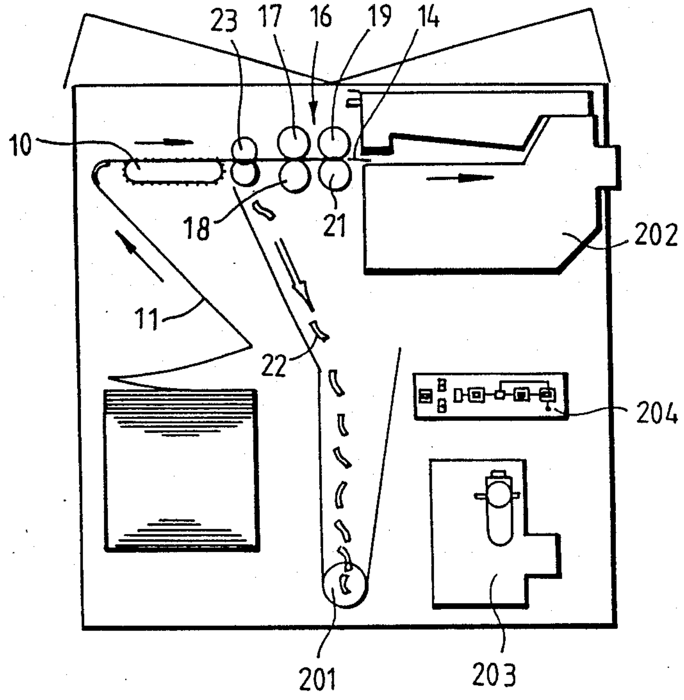
FIG. 4 is a side elevation, corresponding generally to FIG. 2, of a modified machine.
Figure 5:
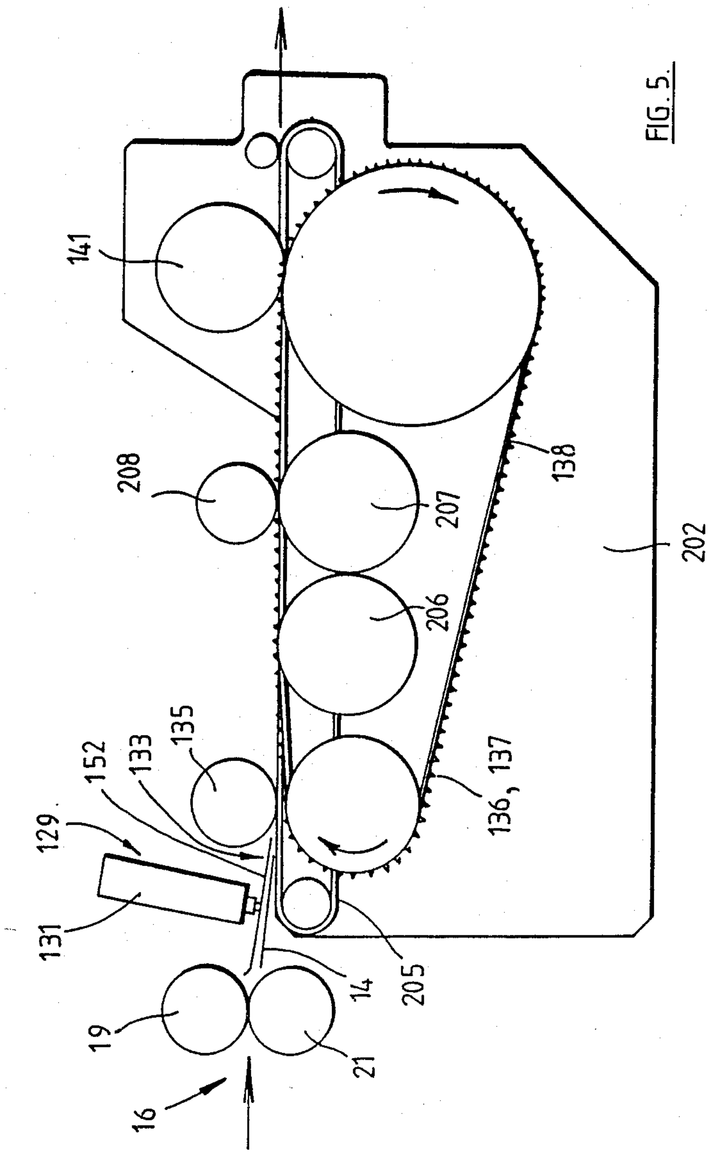
FIG. 5 is a side elevation showing part of the arrangement of the modified machine shown in FIG. 4, in greater detail.

In the modified machine illustrated in FIGS. 4 and 5 cheques 14 leaving the output rollers 19 and 21 of the bursting station 16 are fed onto a conveyor 205 with the aid of a deflector plate 152. The adhesive station 129 represented by a transverse row of adhesive heads 131 is controlled from the control unit 204 to apply adhesive at appropriate locations on a cheque 14 under control of the control unit 204 and in response to photo cell detection of a cheque 14.

A registration station 133 is defined primarily by a roller or series of wheels 135 in co-operation with the conveyor 205. As with the embodiment illustrated in FIGS. 1 to 3, an indexing conveyor 138 incorporates a tractor drive belt with pegs 136 and 137 which engage with corresponding guide holes in the cheques 14 to complete the accurate location thereof. The conveyor 205 is driven intermitently to deliver the cheques 14 to the registration station 133 marginally in advance of or simultaneously with the arrival of the appropriate pegs 136 and 137 on the indexing conveyor 138. If necessary the pegs 136 and 137 can then travel a short distance before engaging in the guide holes and finalising the required registration of a cheque 14.

The cheques 14 are thus collated on the indexing conveyor 138 in a shingled form with staggered overlap between adjacent forms defined by the indexing distance and the pitch between the pegs 136 and 137. The conveying surface of the conveyor 205 is supported on two rollers 206 and 207 and a pinch wheel 208 pressurises the collated cheques 14 together to render the adhesive effective.

As with the embodiment described with reference to figures 1 to 3, a slitter 141 slits each shingled collation of cheques 14 into two corresponding collations of cheques. The collations are stripped from the pegs 136 and 137 by having a patch for the pegs 136 and 137 which drops below the surface of conveyor 205 prior to the end thereof and the collated sets of cheques are delivered from the conveyor 205 to a take-off conveyor (not shown).

As with the previous embodiment, the operation of the conveyor 205 and indexing conveyor 138 is controlled in response to photo cell detection of the arrival of a cheque 14 in order to maintain it in synchronisation with the cheques 14. Also as with the earlier embodiment, the control system 204 arranges to omit the application of adhesive at regular intervals so that the cheques 14 are collated into a series of separate batches.

The embodiment described with reference to FIGS. 4 and 5 provides a more compact arrangement than that described with reference to FIGS. 1 to 3. As a result less space is available for the collection of edge trimmings and consequently an extractor 201 is provided for removal of the trimmings. An adhesive tank 203, which serves as a reservoir for the adhesive heads 131 is also incorperated into the machine.

I claim:

1. A machine for providing a collation of a series of forms with partial overlap defined by a predetermined stagger from a continuous web of such forms, the machine comprising means for feeding the web continuously into a separating station, means at the separating station for separating the web along transverse lines, means for feeding the individual forms consecutively to a collation registration station, means for interrupting movement of a form at the registration station and means for advancing that form through the distance of the stagger with respect to the next form to be received at the registration station whereby each form as it arrives at the registration station is offset from the preceding form by the predetermined stagger and means for applying adhesive for holding forms together with said predetermined stagger.

2. A machine as claimed in claim 1 in which the means for interrupting movement of a form is an intermittently drive conveyor.

3. A machine as claimed in claim 1 in which the means for interrupting movement of a form includes a stop which can be moved out of the path of a form to allow the form to be indexed.

4. A machine as claimed in claim 3 in which the stop is a rotatable stop which can be rotated out of the path of a form.

5. A machine as claimed in claim 1 in which a form is indexed away from the registration station by an indexing conveyor having a means for engagement with guide holes in a form for alignment, registration and transportation of forms.

6. A machine as claimed in claim 5 in which an intermitantly driven conveyor controls delivery of a form to the indexing conveyor, the intermitently driven conveyor and indexing conveyor being driven in unison.

7. A machine as claimed in claim 5 in which the means for engagement with the guide holes are a series of pegs.

8. A machine as claimed in claim 5 in which a rotatable stop controls delivery of a form to the indexing conveyor, the stop and the indexing conveyor being driven in unison.

* * * * *

UNITED STATES PATENT AND TRADEMARK OFFICE

CERTIFICATE OF CORRECTION

PATENT NO. : 4,851,075

DATED : July 25, 1989

INVENTOR(S) : Colin Richard PARKER

It is certified that error appears in the above—identified patent and that said Letters Patent is hereby corrected as shown below:

Column 6, line 23 - change "drive" to "driven".

Signed and Sealed this

Third Day of July, 1990

Attest:

HARRY F. MANBECK, JR.

Attesting Officer

Commissioner of Patents and Trademarks